Patented Apr. 7, 1936

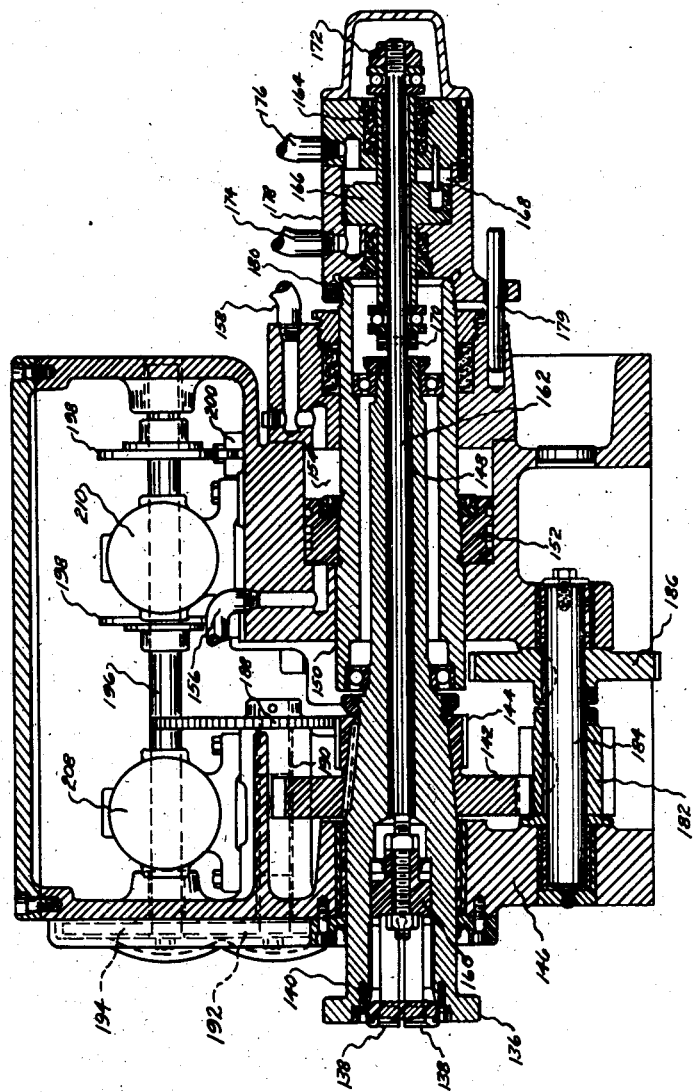

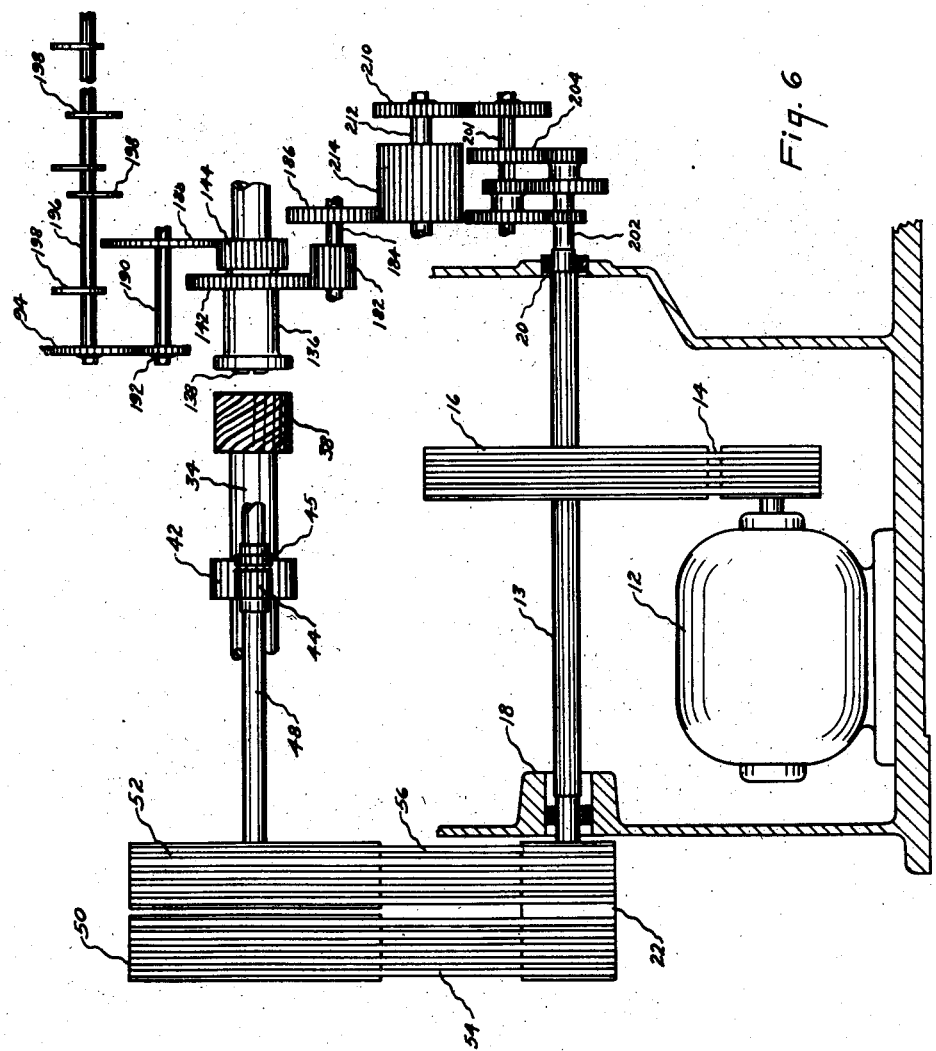

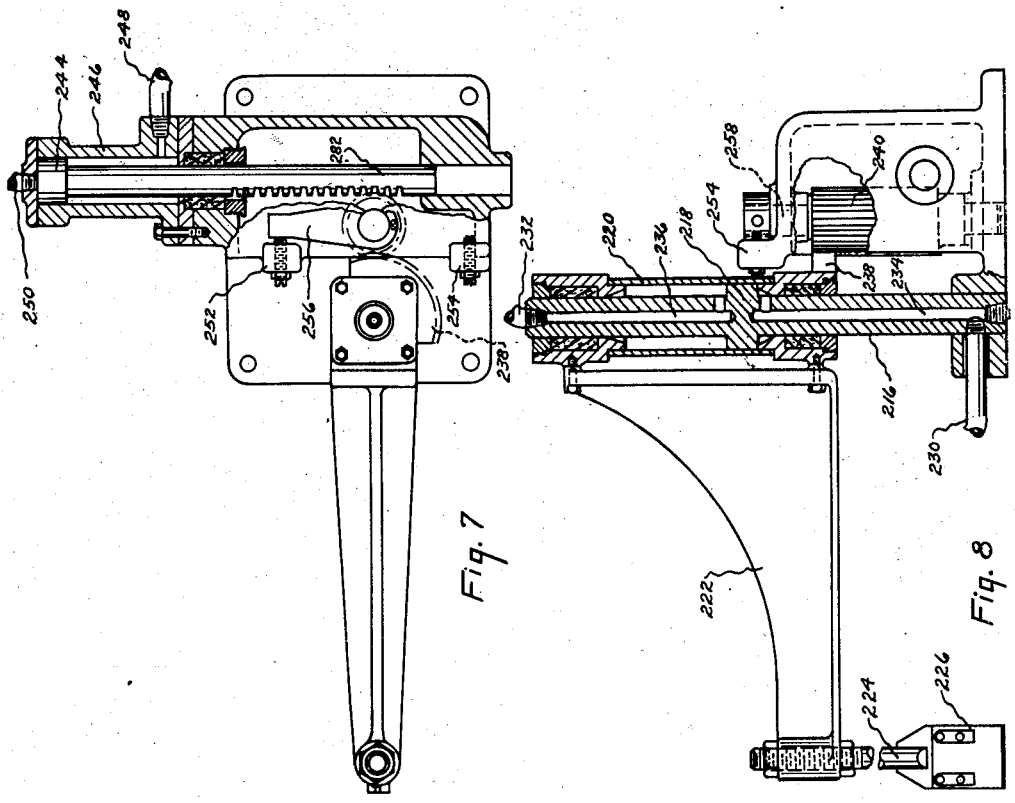

2,036,967

UNITED STATES PATENT OFFICE 2,036,967

MILLING MACHINE

Nels S. Lundberg and Charles B. De Vlieg, Jackson, Mich., assignors to Turnmilling Corporation, Jackson, Mich., a corporation of Michigan Application July 5, 1935, Serial No. 29,834

34 Claims. (Cl. 90—20)

The present invention relates to improvements in machine tools and is concerned with improvements in the construction of mechanism for and the method of machining parts with increased production at materially reduced cost over present practices.

Without placing any limitation upon the scope of the present invention, it is convenient to refer to the operation performed by the machine tool herein disclosed as "turn-milling" as distinguished from conventional milling and turning. In milling and turning as is practiced at the present time, very definite limitations have been placed upon production by the cutting speeds and the magnitude of cutting that can be practically employed. According to the present invention, it has been found that by departing from standard machine design and embodying the principles of turning and milling in a particular manner with reference to machine construction and operation that standard cutting speeds can be materially increased with corresponding increase in production without sacrifice of tool life or equality of workmanship.

Another object of the present invention is to provide a machine tool in which machine operations heretofore performed upon a lathe are accomplished by a turn-milling operation with substantial increases in production.

Another object is to provide a machine tool and method of profile machining of parts by a combined turning and milling operation.

A further object is to provide a machine tool comprising opposed milling cutters acting to machine and support a rotated part.

A still further object resides in the provision of novel mechanism in a machine tool embodying opposed milling cutters for rigidly driving and feeding the cutters into the work.

A further object resides in novel mechanism for automatic loading of the work and mechanism for controlling the loading and sequence of operation of the machine.

Figure 1:
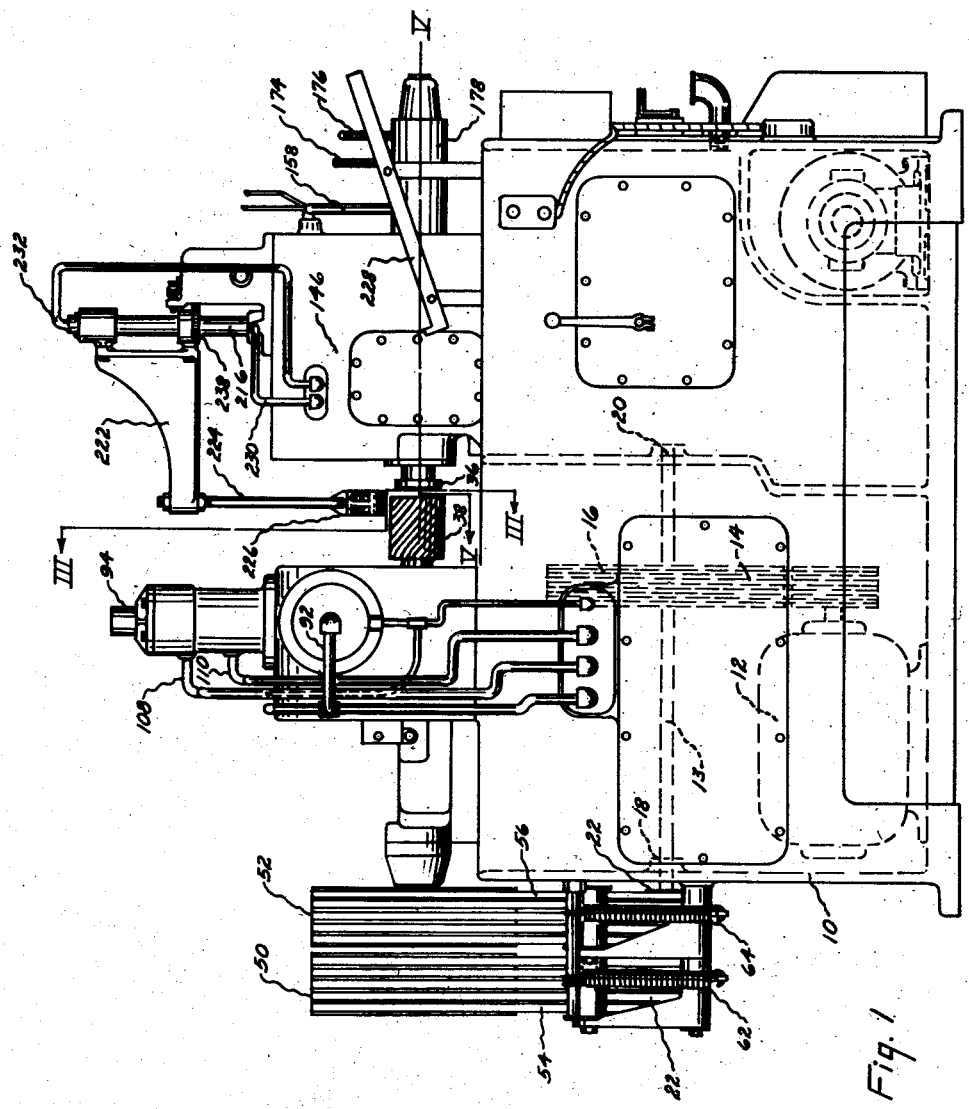
Figure 2:
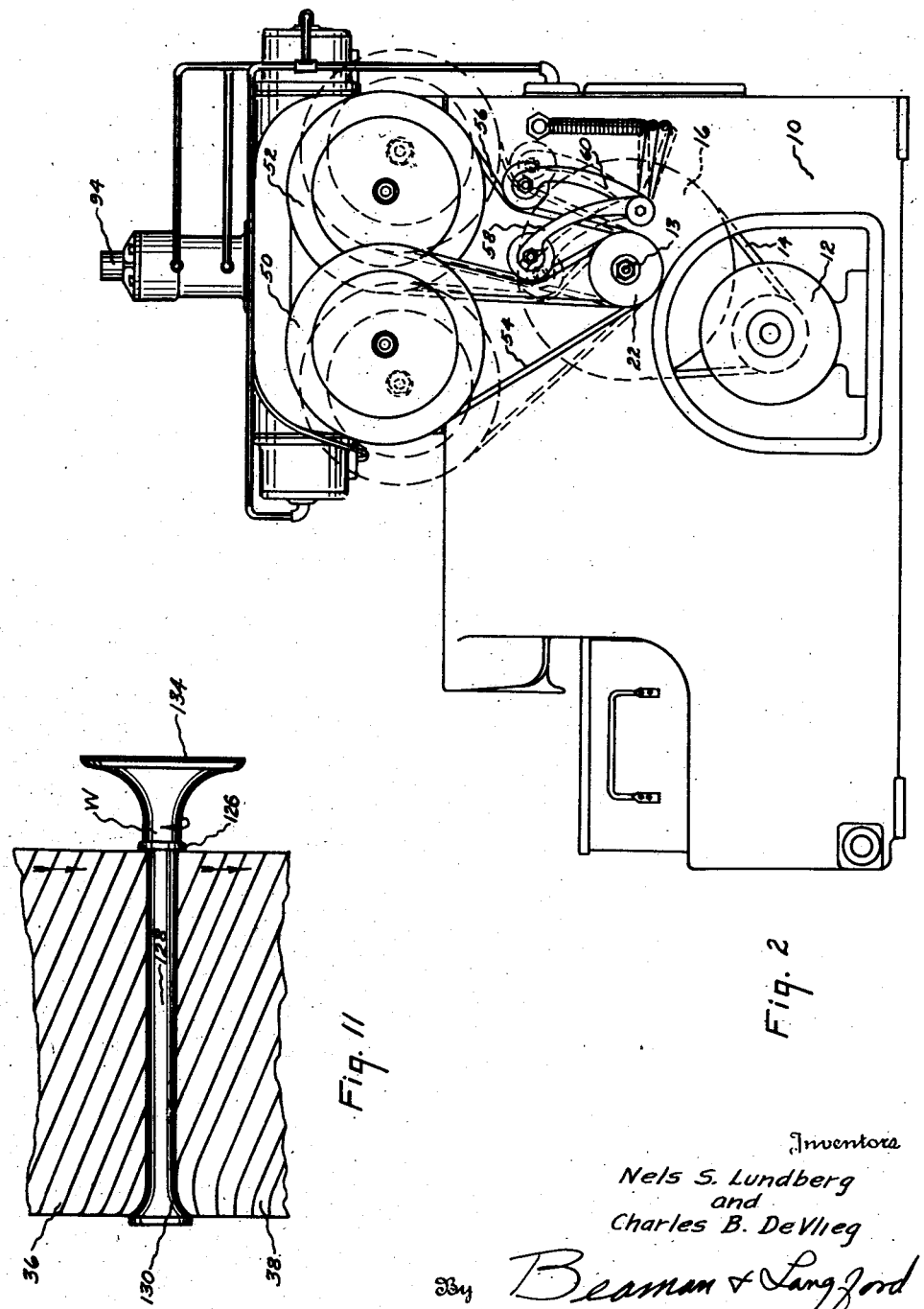
Figure 3:
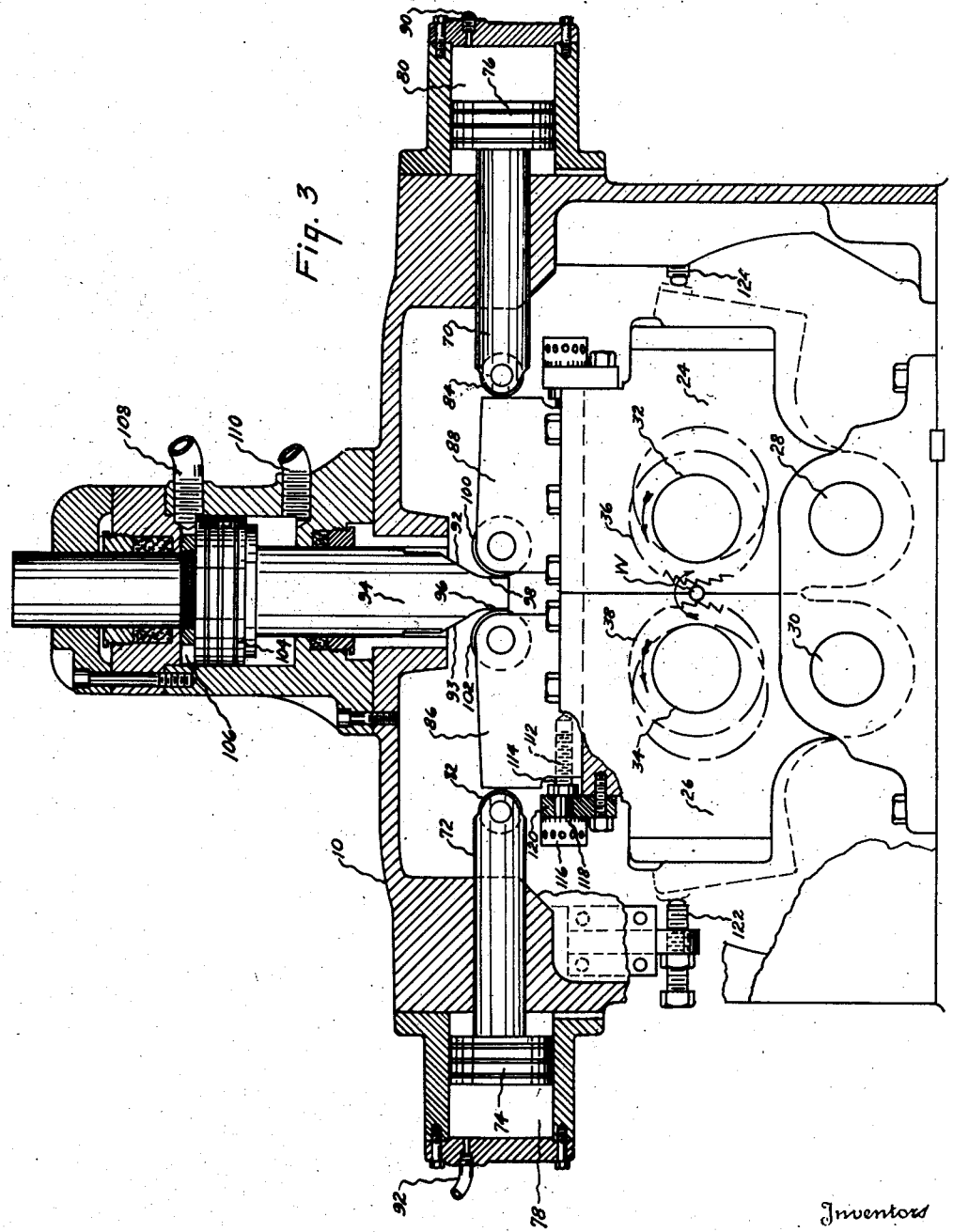
Figure 4:
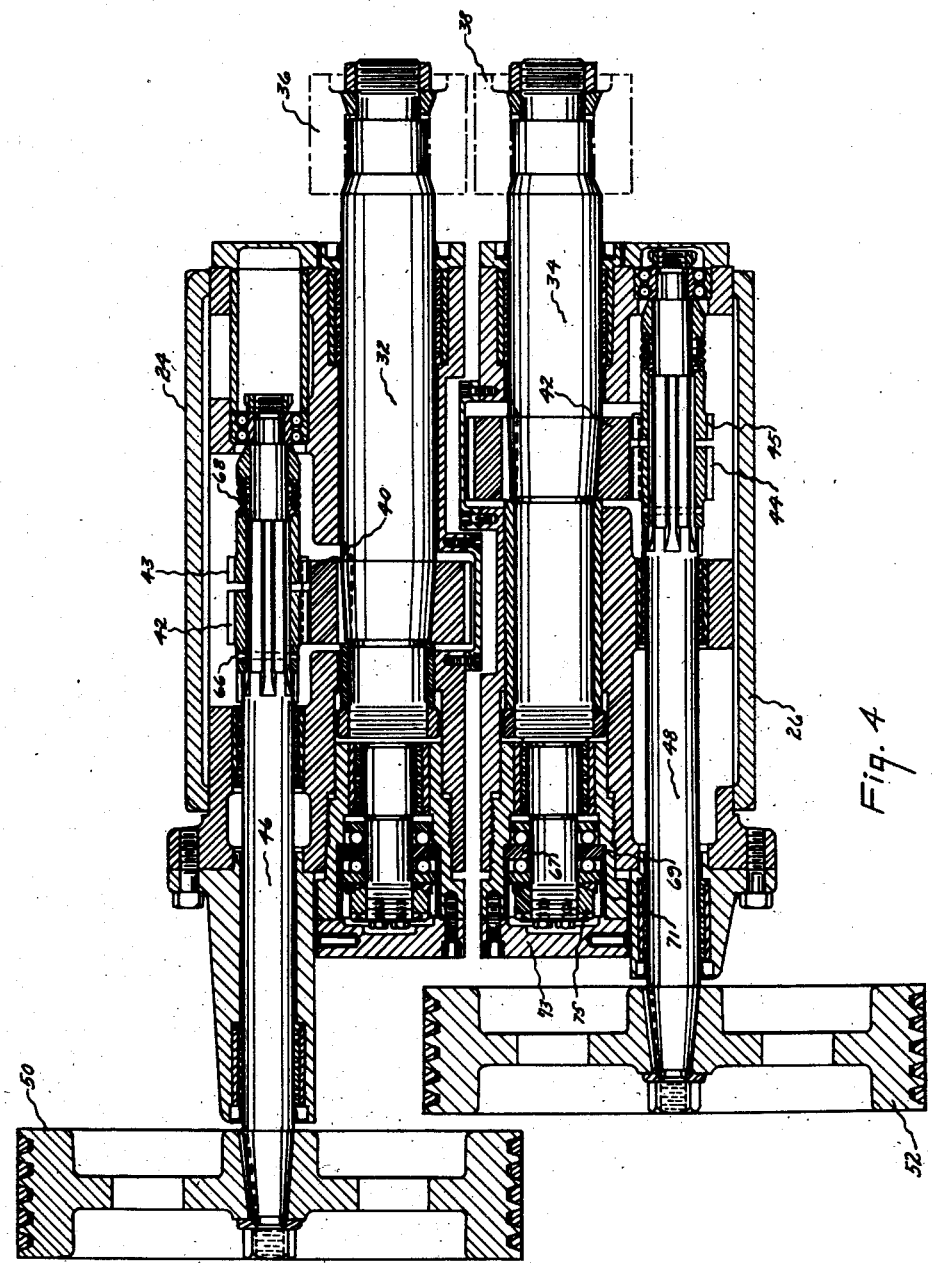
Figure 10:
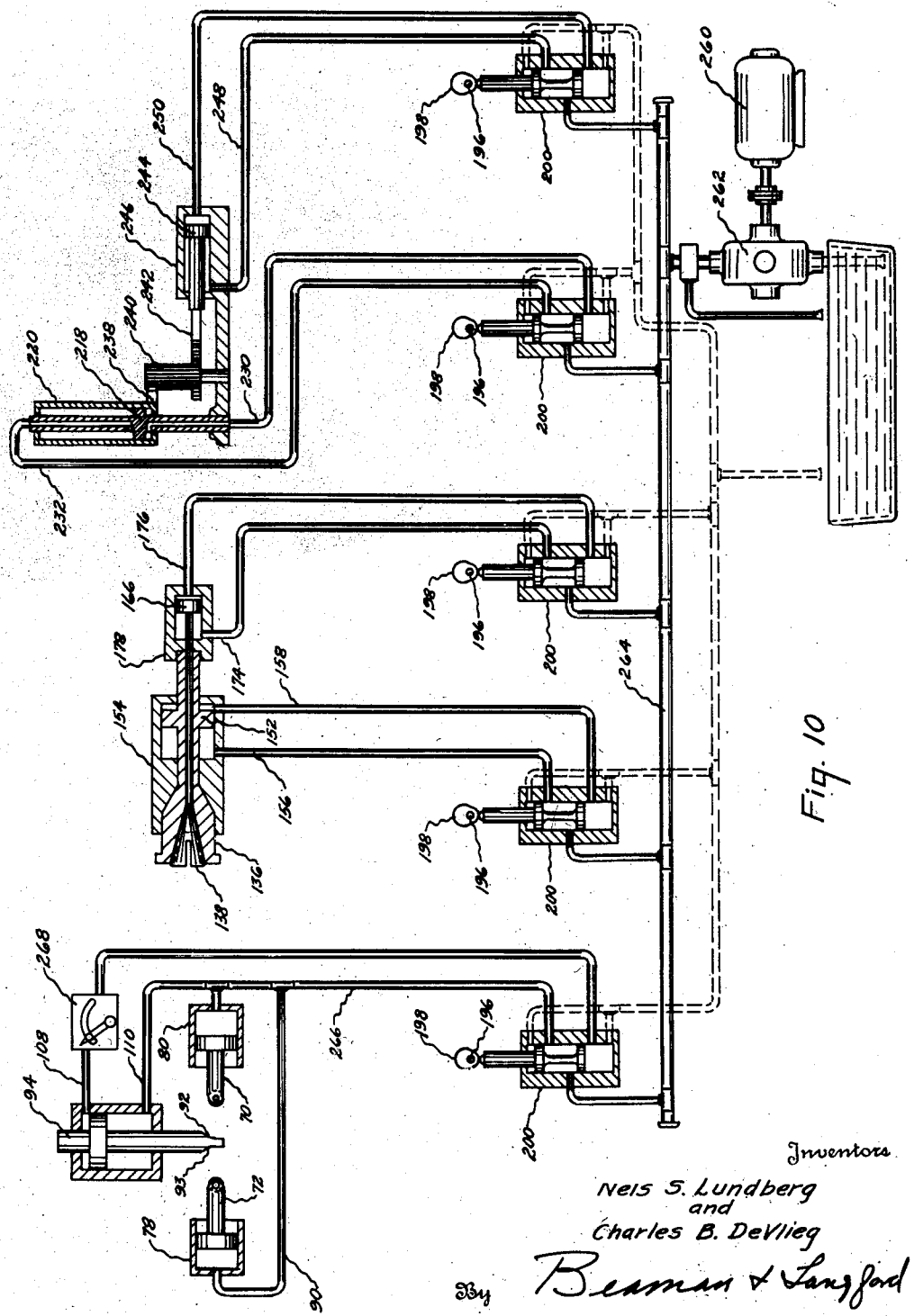

These and other objects residing in the arrangement and construction and combination of parts will be more fully set forth in the following specification and claims and will become apparent when considered in connection with the accompanying drawings illustrating one practical form of the invention wherein Fig. 1 is a side elevational view of the machine, Fig. 2 is an end view of the machine taken from the left of Fig. 1, Fig. 3 is a view of the tool carriages and feed structure partly shown in broken section as viewed from the right of Fig. 1, along the line III—III, Fig. 4 is a horizontal section taken in the plane of the spindles of the tool carriages and associated parts, Fig. 5 is a horizontal section taken on line V—V of Fig. 1 through the work chucking and rotating structure, Fig. 6 is a diagrammatical view of the main and secondary driving mechanisms, Fig. 7 is a plan view partly shown in broken section of the work loading mechanism, Fig. 8 is a side elevational view partly shown in broken section of the construction shown in Fig. 7, Fig. 9 is an end elevational view of the work engaging structure shown in Fig. 8, Fig. 10 is a diagrammatic representation of the fluid operating and controlling mechanism, and Fig. 11 is a fragmentary view of opposed profile milling cutters machining a valve stem.

Main drive and tool carriages

Referring to Figs. 1 and 2, particularly, within the main frame 10 of the machine is housed a motor 12 driving the main power take-off shaft 13 through a V-belt 14 running over a pulley 16. The shaft 13 is journaled at 18 and 20 in the frame 10 and extends beyond the frame 10 at the left end of the machine as viewed in Fig. 1 to receive driving pulleys 22. As more clearly shown in Figs. 3 and 4, a pair of opposed tool carriages 24 and 26 are supported upon rock shafts 28 and 30 and are capable of limited rocking movement to and from the work w chucked for rotation as indicated by the full and dotted line positions. Rotatably supported within the carriages 24 and 26 are spindles 32 and 34 having opposed milling cutters 36 and 38 carried at one end thereof. Arranged in offset relation for sake of compact and desirability of closely positioning the spindles 32 and 34 are helical gears 40 and 42 suitably splined to the spindles 32 and 34. These gears mesh with sets of helical gears 42—43 and 44—45 located upon the shafts 46 and 48, respectively. The construction and function of these gear sets will be more fully described hereinafter. Pulleys 50 and 52 drive the shafts 46 and 48 and are driven through V-belts 54 and 56 running over the pulleys 22 upon the main drive shaft 13. To maintain proper driving connection between the pulleys 54 and 52 and the belts 54 and 56, respectively, as the tool carriages 24 and 26 rock about the shafts 28 and 30, belt tighteners 58 and 60 are constantly urged into engagement with the belts 54 and 56 by springs 62 and 64.

As it is essential to satisfactory high speed production that extreme rigidity of construction and positive actuation of parts be maintained, not only is the frame 10 and carriages 24 and 26 heavily constructed but in addition, special precaution is taken to eliminate all back lash and end play in the cutter spindles 32 and 34. This is accomplished in the illustrated embodiment of the invention with respect to back lash by the construction of the sets of helical gears 42—43 and 44—45 meshing with the helical gears 40 and 42. To describe only one set of gears as they are identical, the helical gears 42 and 43 at the time they are hobbed together are slightly spaced with the result that when they are in mesh with the helical gear 40 they are likewise slightly spaced as shown. Both gears 42 and 43 are splined to the shaft 46, however, the gear 42 is held against axial movement by the pin 66 while the gear 43 is free to move axially upon the shaft 43 with straight line movement under the urge of the spring 68. With this arrangement it will be understood that under the stress of the spring 68 the teeth of the gear 42 will always be in rigid engagement with one side of the teeth of the gear 40 while the teeth of the gear 43 will have similar engagement with the opposite sides of the teeth of the gear 43 with the result that all back lash is removed. Elimination of end play and the assurance of permanent running alignment of the milling cutter is accomplished through thrust bearings provided at the end of the spindles 32 and 34 removed from the end upon which the cutters are mounted. To describe only one of the bearings, as they are identical, it comprises a center thrust plate 67 held against movement in one direction by the shoulder 69 and in the opposite direction by the sleeve 71 positioned by the removable plate 73. A nut 75 threaded upon the end of the spindle 34 preloads the roller bearings located upon opposite sides of the plate 67 and also provides for the axial adjustment of the spindle. The tool carriages 24 and 26 are substantially identical in construction except for the offset relation of the helical gear trains and the pulleys 50 and 52.

Feed mechanism

As more clearly shown in Fig. 3, the mechanism for rigidly feeding the cutters 36 and 38 into work w comprises a pair of horizontally reciprocated hydraulically operated plungers 70 and 72 directly connected to pistons 74 and 76 operating in cylinders 78 and 80 supported by the frame 10. Antifriction rollers 82 and 84 are located at the outer ends of the pistons 70 and 72 and engage blocks 86 and 88 rigidly carried by the tool carriages 24 and 26, respectively. Fluid under pressure directed through conduits 90 and 92 against the pistons 74 and 76 acts to urge the carriages 24 and 26 toward each other and the cutters 36 and 38 into the work w. For regulating the rate and depth of feed, a vertically reciprocated feed cam 94 is provided having inclined surfaces 92 and 93 for regulating the rate of feed and relatively flat surfaces 95 and 98 limiting the depth of feed. Antifriction rollers 100 and 102 journaled in the blocks 86 and 88 engage with the operating surfaces of the cam 94. For reciprocating the feed cam 94, a piston 104 is directly connected thereto operating in its cylinder 106. Fluid under pressure is admitted through the conduits 108 and 110 for raising and lowering the cam 94. It should appear from the foregoing described construction that plungers 70 and 72 can only feed the cutter into the work as the cam 94 is being positively raised by fluid pressure. As the parts are all heavily constructed, with this arrangement the tool carriages are firmly clamped between the plungers 70 and 72 and the surfaces of the cam 94 while the cutters 36 and 38 are being fed into the work. In order to adjust the relative positions of the blocks 86 and 88 upon the carriages 24 and 26 to vary the extent of inward feed of the cutters 36 and 38, the blocks 86 and 88 are slidably supported and are tapped at 112 to receive an adjustment screw 114 rotatably through a head 116 having a graduated scale 118. The screw 114 has its bearing in the block 29 which has suitable indicia thereof cooperating with the scale 118 to enable precise adjustment to be made in the extent of inward feed of the cutter. Adjustable stops 122 and 124 determine the outer swinging movement of the carriages 24 and 26 about the rock shafts 28 and 30.

Work rotating mechanism

In Fig. 11 the work w is illustrated as being a cast or forged valve and the milling cutters 36 and 38 as profile cutters milling a shoulder 126, a cylindrical section 128 and a conical section 130. Preferably the cutters 36 and 38 and work w is rotated in the direction indicated by the arrows in Figs. 3 and 11 to "climb" cut. For automatically chucking and rotating the work w for the milling to circular cross section, the end 132 is adapted to be rotatably supported in a suitable center (not shown), while the head end 134 is chucked in the rotated collet 136. The collet 136 comprising a plurality of resilient jaws 138 which upon relative axial movement are urged into clamping engagement with the work by the conical cam portion 140. Gears 142 and 144 rotate the collet 136 in suitable bearings within the housing 146. Preferably the collet 136 is axially movable to expedite the loading and unloading of the work. In the illustrated embodiment of the invention, this is accomplished by rotatably supporting the portion 148 of the collet 136 within a reciprocal sleeve 150 upon which the piston 152 operating in the cylinder 154 is mounted as a unit. Fluid under pressure is admitted under pressure to opposite ends of the cylinder 154 through conduits 156 and 158 for axially reciprocating the collet 136. To effect relative axial movement between the collet body and the jaws 138 for opening and closing the same upon the work piece, the jaws 138 are carried by a head 160 which is in time connected to a control rod 162 supported for rotation within the sleeve 164 integral with the piston 166 operating in the cylinder 168. A member 170 at one end of the sleeve 164 and a nut 172 threaded upon the outer end of the rod 162 causes the rod 162 and sleeve 164 to reciprocate as a unit as fluid under pressure is directed through the conduits 174 and 176, against opposite ends of the piston 166. It will be understood that the piston 160 and control rod 162 rotates with the collet 136 as a unit. The housing 178, in which the cylinder 168 is defined, is threaded at 180 upon one end of the sleeve 150 so that these parts reciprocate as a unit as fluid pressure is directed against the piston 152. A pin 179 prevents any tendency for the housing 178 and sleeve 148 to rotate with the collet 136 and rod 163 pinned to the rod 162. The gear 142 meshes with and is driven by a gear 182 splined to the shaft 184 which is in time driven by the gear 186. The tooth width of the gear 186 is considerably greater than the gear 142 to permit the latter to reciprocate with the collet 136 in constant mesh with the gear 182. For similar reasons, the gear 144 is of greater tooth width than the gear 188 driving the shaft 190. At the other end of the shaft 190 gear 192 meshes with gear 194 to drive the cam shaft 196 upon which there is located a plurality of cams 198 for operating suitable valves 200 controlling the flow of fluid under pressure regulating the cycle of operation of the machine, as will be more fully described hereinafter.

Collet and cam shaft driving mechanism

At the right end of the main drive shaft 13, as viewed in Fig. 6, is a stub shaft 202 constituting the power take-off for the change gear mechanism generally indicated as 204. A gear 206 splined to the power outlet shaft 208 of the change gear mechanism meshes with a gear 210 driving the shaft 212 upon which the wide gear 214 is located and with which the gear 186 meshes. The shaft 212 is supported in the main frame structure 10 while the shaft 186 is supported in the collet housing 146 as appears from Fig. 5. The wide gear 214 with which the gear 186 meshes thus enables the housing 146 to be longitudinally adjusted relative to the main frame 10 without throwing these gears out of mesh. As heretofore described with reference to Fig. 5, the collet 136 is driven through the gear 182 and 142 while the cam shaft 196 is driven from the collet 136 through the gears 144, 188, 192, and 194.

Loading mechanism

Referring particularly to Figs. 1, 7, 8, and 9, the automatic loading mechanism for the work piece w comprising a vertical stationary piston 216 supported upon the housing 146 having a head 218 slidably received within a vertically reciprocal cylinder 220. An arm 222 is rigidly carried by the cylinder 220 and in turn carries a rod 224 having a work engaging resilient clip 226. The clip 226 is adapted to be pressed down over the cylindrical portion 128 of the work w shown in Fig. 11 in transferring the same from the storage chute 228 shown in Fig. 1 to chucking position in the collet 136. Fluid under pressure is directed through the conduits 230 and 232 through passages 234 and 236 against opposite sides of the head 218 to move the cylinder 220 and its associated arm 222 up and down in a vertical plane. In one lowered position of the cylinder 220, the clip 226 will be in a position engaging the work in the chute 228 for transferring the same and in another lowered position it will position the work in axial alignment with the collet 136 for chucking the same for rotation.

The structure for swinging the arm 222 about the vertical axis of the cylinder 220 comprising a segmental gear 238 attached to the lower end of the cylinder 220. This gear meshes with an elongated pinion 240; the length of the pinion 240 being sufficient to maintain the same in mesh with the gear 238 as the cylinder 220 is raised and lowered. A rack 242 meshes with the pinion 240 and is reciprocated by a piston 244 integral therewith and operating in a cylinder 246. Fluid under pressure is directed through the conduits 248 and 250 against opposite sides of the piston 244 to reciprocate the rack 242 to swing the arm 222 from the position shown in Figs. 1 and 7, to a position over the chute 228 and return. Adjustable stops 252 and 254 engage the arm 256 keyed to the shaft 258 oscillated by the pinion 240 to limit the swinging positions of the arm 222.

Fluid operating and controlling structure

In Fig. 10 is a diagrammatic illustration of the fluid pressure control system for regulating in timed relation the operation of the machine. A motor 260 drives a pump 262 for directing fluid under pressure through the main supply conduit 264 communicating with each valve structure 200. The cams 198 are so designed and arranged upon the cam shaft 196 as to direct fluid under pressure in predetermined timed relation into the cylinders associated with the various operating structure. In the control of the cam 94 and plungers 70 and 72, it is to be noted that although the conduits 90, 92, and 110 all communicate with a common conduit 266, the rate of withdrawal of the cam 94 is controlled by the rate of exhaust of the operating fluid through the conduit 108 past the adjustable metering valve 268. With this arrangement, the cutters are being fed with full line pressure at all times yet the rate of feed may be widely varied by regulating the rate of exhaust through the conduit 108 past the valve 268. This gives a degree of rigidity and uniformity of feed that can not be accomplished by mechanical means. No attempt has been made to indicate relative position of the cams 198 and valves 200.

Operation

Assuming that the milling operation has just been completed upon a work piece w one of the cams 198 upon the cam shaft 196 will actuate a valve 200 to urge the piston 166 shown in Fig. 10 to the left to open the jaws 138 to release the work piece and at the same time another cam 198 upon the cam shaft 196 will actuate another valve 200 to direct fluid pressure against the piston 152 to move the collet axially to permit the work to drop by gravity into a suitable receptacle or discharge (not shown). While the unloading of the work is taking place the arm 222 has been swung to a position over the chute 228 by the direction of fluid pressure against the piston 244 to move the same to the left of the position shown in Fig. 10, and in timed relation has been lowered to engage the work piece located in the chute 228 by the direction of fluid pressure through the conduit 230 against the fixed piston 218. With the work engaged in the clip 226 the same is lifted from the chute 228 by pressure directed through the conduit 233 which will elevate the sleeve 220 and its associated arm 222 to a position whereby the work piece may be swung into the longitudinal plane of the machine clearing the cutter 38. The swinging movement of the arm 222 from the position shown in Fig. 8 to the longitudinal plane of the machine is accomplished by the direction of fluid pressure through the conduit 238 to move the piston 244 to the right as shown in Fig. 10. The arm 222 then is lowered in the manner above described to bring the work piece into axial alignment with the collet 136 and a suitable center (not shown). The collet 136 is then moved to the left as shown in Fig. 10 to position one end of the work piece within the jaws 138 and the jaws clamp the work for rotation through the movement of the rod 162 to the right as shown in Fig. 5, by directing fluid pressure against the left end of the piston 166. During the period while the finished work piece is being unloaded and a new piece loaded, the tool carriages have been swung outwardly in opposite directions upon the rock shafts 28 and 30 by the lowering of the cam 94 and the tendency of the tool carriages 24 and 26 to be urged by gravity to the dotted line position shown in Fig. 3 limited by the adjustable stops 122 and 124. With the new work piece held in position and being rotated by the collet 136, the rotating milling cutters 36 and 38 are fed into the work by the inward movement of the plungers 70 and 72 being urged into contact with the blocks 86 and 88 with full line pressure. Under the action of the plungers 70 and 72 the rollers 100 and 102 rigidly engage the surfaces 92 and 93 of the cam 94 which act in the nature of stops and the tool carriages are thus rigidly clamped between the plungers 70 and 72 and the cam 94 with the result that as fluid pressure is directed against the lower side of the piston 104 and exhausted upon the upper side of the piston at a predetermined rate the tool carriages have a preloaded feeding movement into the work. As more clearly shown in Fig. 3, the milling cutters 36 and 38 transversely engage opposite sides of the work piece w with the result that each cutter tends to give transverse support to the work piece against the cutting action of the other cutter.

In carrying the principles of the invention herein described into practice, the transverse support of the work piece applied in the field of cutting against the action of the milling cutter is of considerable importance and makes possible the turn-milling of relatively small work pieces at high speeds. Obviously, in the employment of two or more milling cutters the production may be materially increased over a single milling cutter. However, we do not wish to limit the invention to the employment of an opposed cutter for the purpose of imparting transverse support to the work piece as it is quite possible to use other means. Such as, for example, a roller might be substituted for the one of the milling cutters and urged into rolling engagement with the work piece while the cutting operation is being accomplished by a cutter operating upon the opposite side of the work piece from the supporting roller. Also, in the embodiment of the invention illustrated, the opposed milling cutters are in transverse alignment and are operating upon the same area of the work piece. This is not always necessary and desirable and in many cases it may be desired to have the opposed cutters in offset transverse relation and operating upon entirely different areas of the work piece. For example, in milling of step down pulleys opposed cutters might be milling different diameters of the work and would be arranged in offset relation yet at the same time would be imparting lateral support to the work against the cutting action of the opposed cutter. It will be readily apparent to those skilled in the art that the tool carriages may be slidable in the framework in lieu of being locked about the rock shafts 28 and 30.

Many of the features of the invention herein disclosed have application in machine tools of other types and constructions, other than as herein illustrated and described, and for this reason it is not our desire to limit the invention other than in the manner and to the extent appearing in the annexed claims.

Having described our invention, what we claim as new and desire to protect by Letters Patent is:

1. In a milling machine for high productive machining of work to circular section comprising work holding means adapted for rotation, milling cutters arranged about said work and adapted to engage with the periphery thereof, means mounting said cutters and work holding means for relative movement with respect to each other, said milling cutters engaging the work such that each cutter acts to resist the action of the other through the work, and means for rotating said milling cutters.

2. In a milling machine for high productive machining of work to circular section comprising work holding means adapted for rotation, milling cutters arranged about said work and adapted to engage with the periphery thereof, means mounting said cutters and work holding means for relative movement with respect to each other, said milling cutters engaging the work such that each cutter acts to resist the action of the other through the work, means for rotating said milling cutters in the same direction, and means for rotating said work holding means in the opposite direction.

3. In a milling machine for high productive machining of work to circular section comprising work holding means adapted for rotation, milling cutters arranged about said work and adapted to engage with the periphery thereof, means mounting said cutters and work holding means for relative movement with respect to each other, said milling cutters engaging the work such that each cutter acts to resist the action of the other through the work, means for simultaneously rotating said cutters and work holder, said cutters and work holder being held against relative axial movement.

4. A milling machine for high productive profiling machining of forged or cast engine valves or the like comprising means for supporting and rotating said valve about its longitudinal axis, profile milling cutters supported for rotation about axes parallel to said axis and arranged to be brought into engagement with the periphery of said valve to transversely support the same such that each cutter acts to resist the action of the other through the work, means for simultaneously rotating said cutters and valves during the machining operation, said cutters and valve being held against relative axial movement.

5. A milling machine for high productive milling of work to circular section comprising work holding means adapted for rotation, a milling cutter rotatably supported and adapted to engage the periphery of the work, means for effecting relative feeding movement between the work and said cutter, means for simultaneously rotating said cutter and work, and means engaging and transversely supporting the work in the region of cutting so that the same acts to resist the action of the cutter through the work.

6. In a machine tool, tool supporting means, work supporting means, said means being capable of relative movement with respect to each other, hydraulic means for urging one of said means into engagement with a rigid stop, hydraulic means for gradually removing said stop, and means for regulating the movement of said stop by regulating the rate of flow of a fluid under pressure.

7. In a machine tool, tool supporting means, work supporting means, said work and tool supporting means being capable of relative movement with respect to each other, hydraulic means for feeding one of said means toward the other, and means for regulating the rate of feed of one of said tool and work supporting means including a closed chamber, a restricted outlet communicating with said closed chamber, the regulation of the feed being regulated by the rate of flow of a fluid from said closed chamber through said restricted outlet.

8. A milling machine for high productive machining of work to circular section comprising a rigid framework, rigidly constructed tool carriages supported upon said framework for movement along defined paths with respect to each other, tool spindles located within said carriages, driving mechanism for said spindles, opposed milling cutters carried by said spindles, feeding means including means for urging said carriages toward each other, single means with which said carriages engage, means for regulating said single means to control the rate of feed of said cutters, and work holding and rotating means for supporting and rotating work between said cutters.

9. A milling machine for high productive machining of work to circular section comprising a rigid framework, rigidly constructed tool carriages supported upon said framework for movement along defined paths with respect to each other, tool spindles located within said carriages, driving mechanism for said spindles, opposed milling cutters carried by said spindles, feeding means including hydraulically operated means for engaging with said carriages for urging the same toward each other, a single means with which said carriages engage, means for regulating said single means to control the rate of feed of said cutters, and work holding and rotating means for supporting and rotating work between said cutters.

10. A milling machine for high productive machining of work to circular section comprising a rigid framework, a pair of rigidly constructed tool carriers pivotally supported upon said framework for movement with respect to each other, tool spindles located within said carriages, driving mechanism for said spindles, opposed milling cutters supported upon said spindles, feeding means including hydraulically operated means for engaging with said carriages for urging the same toward each other, a single means with which said carriages engage, means for regulating said single means to control the rate of feed of said cutters, and work holding and rotating means for supporting and rotating work between said cutters.

11. A milling machine for high productive machining of work to circular section comprising a rigid framework, a pair of rigidly constructed tool carriers pivotally supported upon said framework for movement with respect to each other, tool spindles located within said carriages, driving mechanism for said spindles, opposed milling cutters supported upon said spindles, and a pair of hydraulic cylinders located upon opposite sides of said carriages, plunger members operating in said cylinders and engaging with said carriages, a single cam member against which said carriages are urged by movement of said plunger members, means for regulating the movement of said cam to control the rate of feed of said cutters, and work holding and rotating means for supporting and rotating work between said cutters.

12. A milling machine for high productive machining of work to circular section comprising a rigid framework, a pair of rigidly constructed tool carriages pivotally supported upon said framework for movement with respect to each other, tool spindles located within said carriages, driving mechanism for said spindles, opposed milling cutters supported upon said spindles, a pair of hydraulic cylinders located upon opposite sides of said carriages, plunger members operating in said cylinders and engaging with said carriages, a single cam member against which said carriages are urged by movement of said plungers, said plungers and said cam engaging with said carriages in substantially the same general plane, means for regulating the movement of said cam to control the rate of feed of said cutters, and work holding and rotating means for supporting and rotating work between said cutters.

13. A milling machine for high productive machining of work to circular section comprising a rigid framework, a pair of rigidly constructed tool carriages pivotally supported upon said framework for movement with respect to each other, tool spindles located within said carriages, driving mechanism for said spindles, opposed milling cutters supported upon said spindles, and a pair of hydraulic cylinders located upon opposite sides of said carriages, plunger members operating in said cylinders and engaging with said carriages, a single cam member against which said carriages are urged by movement of said plungers, said plungers and cam engaging with said carriages at a point above said cutters.

14. A milling machine for high productive machining of work to circular section comprising a rigid framework, work holding and rotating means for rotating and supporting work about a fixed axis, a pair of rigidly constructed tool carriages supported upon said framework for movement toward and from said axis of rotation, tool spindles located within said carriages, driving mechanism for said spindles, opposed milling cutters carried by said spindles, a rigid movable cam member disposed in a vertical plane of said fixed axis, means upon said carriages engaging with opposite sides of said cam, hydraulically operated plungers engaging said carriages for urging the same into rigid contact with said cam, and means for controlling the rate of feed of said cutters through the regulation of the movement of said cam.

15. A milling machine for high productive machining of work to circular section comprising a rigid framework, rigidly constructed tool carriages supported upon said framework for movement relative to each other, opposed milling cutters supported for rotation in said carriages, abutments defined upon opposite sides of said carriages, hydraulically operated plungers engaging with said abutments for urging said carriages toward each other, a movable cam into engagement with which said carriages are urged by said plungers, means for regulating the movement of said cam to regulate the rate of feed of said cutters, and work holding and rotating means for supporting and rotating work between said cutters.

16. A milling machine for high productive machining of work to circular section comprising a rigid framework, a pair of rigidly constructed tool carriages pivotally supported at their lower ends in said framework for movement about parallel axes, means for supporting and rotating work about a fixed axis of rotation and located between said carriages, opposed milling cutters supported for rotation in said carriages, the location of the center of mass of said carriages and associated parts being so located as to normally tend to rock said carriages outwardly from said fixed axis of rotation.

17. A milling machine for high productive machining of work to circular section comprising a rigid framework, a pair of rigidly constructed tool carriages pivotally supported at their lower ends in said framework for movement about parallel axes, means for supporting and rotating work about a fixed axis of rotation located between said carriages, opposed milling cutters supported for rotation in said carriages, means defining abutments on opposite sides of said carriages, hydraulically operated plungers adapted to be engaged by said abutments to rock said carriages inwardly toward said fixed axis of rotation, a cam member having symmetrical surfaces on opposite sides thereof located in a vertical plane of said fixed axis, opposed means on said carriages engaging with said surfaces of said cam, movement of said plungers along said abutments urging said last means into rigid engagement with said surface, and means for regulating the movement of said cam for controlling the rate of feed of said cutters toward a fixed axis of rotation.

18. A milling machine for high productive machining of work to circular section comprising work holding and rotating means for supporting inwardly and rotating the work about a fixed axis of rotation while the same is being milled to circular cross section, a pair of rigidly constructed tool carriages, opposed milling cutters supported in said carriages, means for continuously rotating said cutters while the work is being rotated, and means for continuously feeding said carriages toward said fixed axis of rotation while said cutters and said work are being relatively rotated.

19. A milling machine for high productive machining of work to circular section comprising work holding and rotating means for supporting and rotating the work about a fixed axis of rotation while the same is being milled to circular cross section, a pair of rigidly constructed tool carriages, opposed milling cutters supported in said carriages, means for continuously rotating said cutters while the work is being rotated, and means for continuously feeding said carriages inwardly while said cutters and work are being rotated with respect to each other, said first means including means preloading the feeding movement of said carriages and cutters into the work.

20. A milling machine for high productive milling of work along circular arcs comprising a rigid framework, rigidly constructed tool carriages supported upon said framework, opposed milling cutters supported in said carriages for engagement with opposite sides of the work, means for rotating said cutters, means imparting only inwardly and substantially equal feeding movement to said cutters while the work is being milled to size, whereby each cutter acts equally to support the work against the cutting action of an opposite cutter, and work holding and rotating means for positioning the same between said cutters.

21. A milling machine for high productive milling of work along circular arcs comprising a rigid framework, rigidly constructed tool carriages supported upon said framework, opposed milling cutters supported in said carriages for engagement with opposite sides of the work, means for rotating said cutters, means acting with substantially uniform continuous force for moving said cutters toward the work, means for providing a permitted feed of said cutters which is only inwardly and substantially equal while the work is being milled to size, whereby each cutter acts equally to support the work against the cutting action of an opposite cutter, and work holding and rotating means for positioning the work between said cutters.

22. A milling machine for high productive milling of work along circular arcs comprising a rigid framework, rigidly constructed tool carriages supported upon said framework, opposed milling cutters supported in said carriages for engagement with opposite sides of the work, means for rotating said cutters, hydraulic means acting with substantially uniform continuous force for moving said cutters toward the work, means for providing a permitted feed of said cutters which is only inwardly and substantially equal while the work is being milled to size, whereby each cutter acts equally to support the work against the cutting action of an opposite cutter, and work holding and rotating means for positioning the work between said cutters.

23. A milling machine for high productive milling of work along circular arcs comprising a rigid framework, rigidly constructed tool carriages supported upon said framework, opposed milling cutters supported in said carriages for engagement with opposite sides of the work, means for rotating said cutters, hydraulic means acting with substantially uniform continuous force for moving said cutters toward the work, single cam means for providing a permitted feed of said cutters which is only inwardly and substantially equal while the work is being milled to size, whereby each cutter acts equally to support the work again the cutting action of an opposite cutter, and work holding and rotating means for positioning the work between said cutters.

24. A milling machine for high productive milling of work along circular arcs comprising a rigid framework, rigidly constructed tool carriages supported upon said framework, milling cutters supported in said carriages for engaging with the work at spaced points about its periphery for milling circular arcs, means for rotating said cutters, means imparting only inwardly and substantially equal feeding movement to said cutters while the work is being milled to size, whereby each cutter acts equally to transversely support the work against the cutting action of the remainder of said cutters, and work holding and rotating means for positioning the work between said cutters.

25. A milling machine for high productive milling of work along circular arcs comprising a rigid framework, rigidly constructed tool carriages supported upon said framework, milling cutters supported in said carriages for rotation, work holding and rotating means for positioning the work between said cutters, said cutters being arranged to engage substantially diametrically opposite portions of the work, preloaded feeding means for advancing said cutters into the work, said feeding means providing equal advancement to the cutters to mill circular arcs of substantially equal radii, whereby each cutter acts equally to support the work against the cutting action of the opposite cutter.

26. A milling machine for high productive milling of work along circular arcs comprising a rigid framework, rigidly constructed tool carriages supported upon said framework, milling cutters supported in said carriages for rotation, work holding and rotating means for positioning the work between said cutters, said cutters being arranged to engage substantially diametrically opposite portions of the work, feeding means for advancing said cutters into the work, said feeding means providing equal advancement to the cutters to mill circular arcs of substantially equal radii, whereby each cutter acts equally to support the work against the cutting action of the opposite cutter.

27. A milling machine for high productive milling of work to circular cross section comprising a framework, a pair of tool carriages supported in said framework for movement toward the work, tool spindles in said carriages, driving mechanism for said spindles, milling cutters upon said spindles, means simultaneously and positively feeding said carriages toward the work, said feeding means feeding both of said carriages into the work to depth with corresponding continuous feed, work holding and rotating means, the work being transversely supported by said milling cutters during the milling operation.

28. In a milling machine, a framework, tool carriages supported in said framework for movement toward the work, tool spindles in said carriages, driving mechanism for said spindles, milling cutters upon said spindles, means for urging said carriages against rigid stops, means regulating the position of said stops relative to said carriages to control the rate of feed of said milling cutters, work holding and rotating means, said work being transversely supported from opposite sides by said cutters during the milling operation.

29. In a milling machine, a framework, opposed tool carriages supported in said framework for movement toward the work, tool spindles in said carriages, driving mechanism for said spindles, milling cutters upon said spindles in opposed relation, work holding and rotating means located between and to one side of said cutters, means for feeding said carriages and cutters toward said work holding means, means moving said work holding means into and out of work engaging position to permit loading and unloading of the work between said cutters, and means for rotating said work holding means, the work being transversely supported from opposite sides by said milling cutters during the milling operation.

30. A machine tool for milling work to circular cross section comprising, a framework, a pair of rock shafts supported in said framework, opposed tool carriages oscillatably supported upon and positioned above said rock shafts, feed mechanism acting upon said carriages to swing the same towards the work, tool spindles in said in said carriage, milling cutters in opposed relation located upon said spindles, work holding and rotating means located between said cutters and to one side thereof, said cutters transversely supporting the work from opposite sides during the milling operation whereby each cutter acts to resist the action of the other through the work, and means controlling the rate and direction of feed of said cutters to provide and maintain said transverse supporting action of the work throughout the entire milling operation.

31. In a machine tool for high productive milling of work to circular cross section, a rigid framework, rigidly constructed tool carriages supported upon said framework for movement along defined paths, tool spindles located within said carriages, driving mechanism for said spindles, antiback lash means imposed between said spindles and said driving mechanism, opposed milling cutters carried by said spindles, feeding mechanism for said carriages including means preloading the feeding movement of said carriages and cutters into the work, and work holding and rotating means for supporting and rotating work between said cutters.

32. In a machine tool for high productive milling of work to circular cross section, a rigid framework, rigidly constructed tool carriages supported upon said framework for movement along defined paths, tool spindles located within said carriages, driving mechanism for said spindles, opposed milling cutters carried by said spindles, feeding mechanism for said carriages including means preloading the feeding movement of said carriages and cutters into the work, and work holding and rotating means for supporting and rotating work between said cutters.

33. In a machine tool, a source of fluid under pressure, a tool carriage, hydraulic means for feeding said carriage, hydraulic means for regulating the rate of feed of said carriage, a work holder, hydraulic means for chucking the work in said holder and for moving said holder into and out of work chucking position, and hydraulically operated means for automatically loading the work.

34. In a machine tool, a work loading device comprising means for engaging and transferring the work from a point without the machine into a position of work holding, said means including a cylinder and a piston, and hydraulically controlled and operated means for imparting relative axial and rotary movement to said cylinder and piston.

NELS S. LUNDBERG.
CHARLES B. DE VLIEG.

DISCLAIMER 2,036,967.—*Nels S. Lundberg* and *Charles B. De Vlieg,* Jackson, Mich. MILLING MACHINE. Patent dated April 7, 1936. Disclaimer filed June 21, 1937, by the assignee, *Turnmilling Corporation.*

Hereby enters this disclaimer to claim 7 of said Letters Patent.

[*Official Gazette July 20, 1937.*]